July 12, 1960  E. F. ROSSMAN  2,944,638
DEVICE TO PREVENT MOVEMENT BEYOND PREDETERMINED RATE
Filed Jan. 17, 1957

INVENTOR.
EDWIN F. ROSSMAN
BY
D. C. Staley
ATTORNEY

United States Patent Office 2,944,638
Patented July 12, 1960

2,944,638
DEVICE TO PREVENT MOVEMENT BEYOND PREDETERMINED RATE

Edwin F. Rossman, Dayton, Ohio, assignor to General Motors Corporation, Detroit, Mich., a corporation of Delaware Filed Jan. 17, 1957, Ser. No. 634,658
7 Claims. (Cl. 188—96)

This invention relates to a device to stop a movement beyond a predetermined rate and, particularly, to a hydraulic means useful, such as on a manual aircraft control, in series or parallel to a control rod or cable to limit the maximum rate at which the control can be applied and to permit normal movement at any rate below the maximum.

A purpose of this invention is to provide a device to prevent rapid application of a control which might produce forces that could cause structural failure or mishap to a vehicle or aircraft controlled by an operator.

Another object is to provide a hydraulic means operative in a housing having a piston reciprocable therein, the piston having holes therethrough with flow control valves cooperable therewith on each of opposite sides of the piston, the valves and openings being normally open to allow for flow of hydraulic fluid in either direction through the piston at a predetermined rate and being closed in one direction or the other depending upon the direction of movement of the piston to effect a hydraulic limit against further movement of the piston until relief of pressure occurs thereon to allow the flow rate of the fluid to drop back to or below the predetermined rate.

A further object is to provide hydraulic means preventing movement beyond a predetermined rate including a cylindrical housing having a piston reciprocable therein mounted on a double-ended rod, the rod being sealingly engaged and movable in a piston chamber and a fluid reservoir chamber, the two chambers being separated by a partition having check valving therein permitting limited interchange of fluid between the piston chamber and reservoir chamber.

Another object is to provide a reciprocable piston cooperable in a housing to control movement relative thereto at a predetermined rate by valving symmetrically disposed therewith on opposite sides of openings through the piston, the valving including on each side of the piston both first and second spring discs cooperable with an annular member or ring which is shiftable under pressure of the flow of a hydraulic fluid to pivot and substantially parallelogram the discs relative to each other to open and close the openings through the piston.

Another object is to provide a velocity limiting safety device to stop movement beyond a predetermined rate in the event of operator panic with release of the stopping or locking when actuating force or effort diminishes or ceases and repeated locking as rate of motion exceeds a predetermined value so that the operator can sense an increase in effort to produce motion as the rate of motion approaches its limit. The device assures that when rate of movement approaches its limit the motion is stopped and locked until any sustained effort below the limit of the predetermined rate persists to continue movement at a safe rate of movement.

Further objects and advantages of the present invention will be apparent from the following description, reference being had to the accompanying drawing wherein a preferred embodiment of the present invention is clearly shown.

Figures 1, 2:
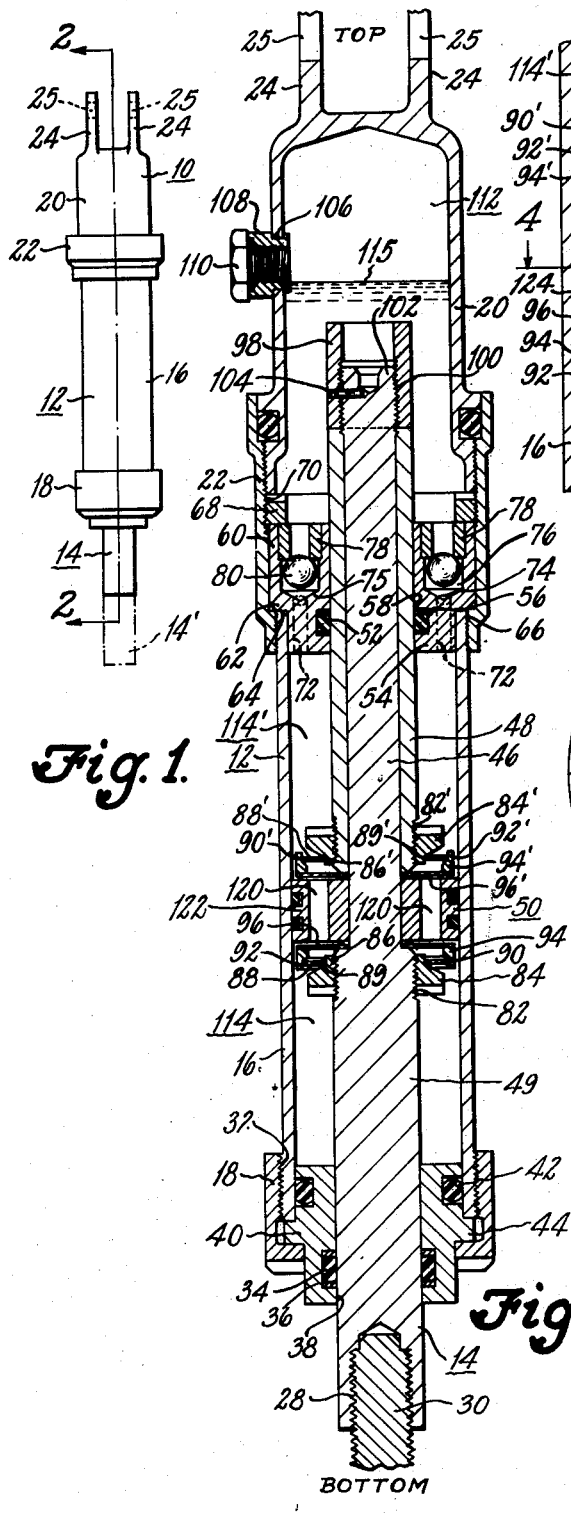
Figure 1 is an elevational view of a velocity limiting device in accordance with the present invention.
Figure 2 is an enlarged cross-sectional elevational view of the device taken along line 2—2 of Figure 1.

With particular reference to Figure 1, a velocity limiting device in accordance with the present invention is shown, generally indicated by the numeral 10. The device includes a housing, generally indicated by numeral 12, and a rod or reciprocable member therein, generally indicated by the numeral 14. The housing includes a cylinder, sleeve, or intermediate body 16 to which is attached a centrally apertured end cover 18. The rod 14 is movable through the end cover aperture or opening and cooperates with structure disposed internally of the housing, as will be described in further detail below. At the end of the housing, opposite end cover 18, is an end body or cylinder cup 20 joined to the cylinder 16 by means of an internally threaded retaining ring or coupling 22. The cylinder cup 20 is provided with a pair of longitudinally extending transversely apertured flanges 24 for mounting purposes using a pin, not shown, which may be fitted through the apertures 25 of the flanges to cooperate with mounting means, such as a bracket on a fixed support.

Figure 1 indicates a phantom extension of the rod 14 to 14′ to represent the travel possible by the rod from a half retracted to a fully extended position.

Figure 2, a cross-sectional elevational view taken along line 2—2 of Figure 1, shows further structural detail of the hydraulic device used to limit control movement to below a predetermined rate. As shown in Figure 2, the rod 14 is attachable through internal threads 28 at its end protruding through the end cap or cover 18 to a movable member 30 threaded therein. The cap 18 is securely fastened as by threads 32 to the cylinder or sleeve 16 causing sealing engagement of the rod 14 through a seal 34 disposed in a groove 36 extending radially outwardly from the inner periphery of a central passage 38 through annular member 40. The annular member 40 is fitted into sealing engagement with the inner periphery of the sleeve 16 with a seal 42 in engagement therebetween, as shown. An annular outwardly extending flange 44 provides positive engagement of the member 40 between the end cover 18 and sleeve 16.

Figure 3:
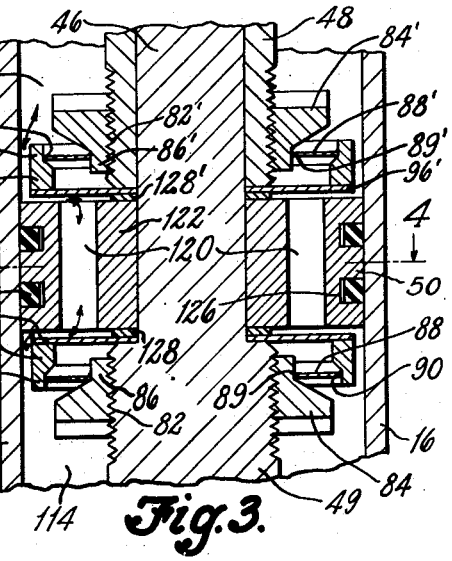
Figure 3 is a further enlarged fragmentary cross-sectional view of a portion of the device in Figure 2 showing symmetrical valving means therein.

As seen in Figures 2 and 3, the rod 14 at its internal end within the housing 12 is provided with the following assembly. The rod has a reduced diameter portion 46, and a larger diameter portion 49. A sleeve or hollow member 48 having the same outer diameter as the larger diameter portion 49 of the rod 14 is slidable over the smaller diameter 46, as shown. This sleeve is secured to the rod, as will be described below, together with a piston means, generally indicated by the numeral 50. The sleeve is reciprocably movable in sealing engagement through a seal 52 with a partition, generally indicated by the numeral 54. The seal 52 may be an O-ring fitted into a radially outwardly extending groove 56 formed with a central opening 58 of the member 54.

The partition or member 54 is provided with a body portion 60 and a radially outwardly extending shoulder 62 engageable against an end 64 of the cylinder 16. The coupling 22 is suitably attached as by threads or by brazing at 66 to the sleeve 16 and the partition 54 is retained within the coupling against the end 64 of sleeve 16 by a retaining ring 68 threaded tightly thereagainst on threads 70 about the inner periphery of coupling 22.

The partition 54 has a plurality of holes 72 extending longitudinally therethrough forming a tapered seat 74 at an intermediate portion 75 of the partition 54. The seat 74 extends into a recess 76 of a larger diameter than the holes 72 and a sleeve or hollow seating member 78 is fitted into the periphery of the recess 76 at the end of the partition opposite the holes 72. The sleeves 78 are retained by retaining ring 68 together with the member 54 in tight engagement with the remainder of the housing, as described above. A check valve means is formed using balls, generally indicated by the numeral 80, cooperable with the seat 74 and the end periphery of sleeves 78, as shown. These balls are unseated to permit flow of hydraulic fluid at a smooth and gradual rate through recesses 76 from opposite sides of the partition 54, in keeping with a functioning of piston means 50 described in further detail below.

Also attached to the rod 14 in addition to the sleeve 48 is the piston means 50, mentioned above. Adjacent the juncture of the large diameter portion 49 and small diameter portion 46 of the rod 14 is a threaded portion 82 onto which an internally threaded fitting 84 is attached. Similarly, a fitting 84′ is attached to an outer threaded end portion 82′ formed with the sleeve 48. The fittings 84 and 84′ are provided with a reduced diameter portion or longitudinal flanges 86 and 86′, respectively. A first disc or annular spring member, generally indicated by numerals 88 and 88′, respectively, is seated about an inner periphery 89 and 89′ of the discs against the flanges 86 and 86′. The outer periphery 90 and 90′ of these first discs is tightly fitted to the inner periphery of a longitudinal flange 92 and 92′ on each of a pair of annular members or rings, generally indicated by the numerals 94 and 94′ on opposite sides of piston means 50. Second discs of larger radial diameter, generally indicated by the numerals 96 and 96′ are secured between the rings 94 and 94′ and about the small diameter portion 46 of rod 14 as the sleeve 48 is fitted together with piston means 50 about the small diameter portion 46 of rod 14. The piston means and discs comprising symmetrical valving disposed on opposite sides of the piston means 50 are secured in tight engagement with the rod 14 by an end sleeve 98 internally threaded to cooperate with threads 100 at the inner end 102 of rod 14. A pin 104 may be inserted into a lateral opening through the end sleeve 98 into engagement with the rod 14 to securely lock the assembly into engagement with all parts of the piston and rod and symmetrical valving cooperating, as described.

Also attached, as shown in Figure 2, with the internal threads 70 of the coupling 22 is the end body or cylinder cup 20 having the same internal diameter as the cylinder 16. Attached or brazed to an opening 106 at one side of the cylinder cup 20 is a fitting or sleeve 108 into which is threaded a filler plug, generally indicated by the numeral 110. Removal of this filler plug 110 permits filling of the housing with hydraulic fluid. It is to be understood that the housing is divided by the partition 54 into a reservoir chamber, generally indicated by the numeral 112, and a piston chamber on opposite sides of piston means 50, as indicated generally by the numerals 114 and 114′. The liquid level of fluid within the housing is indicated by dotted lines 115 near the top of the housing within the reservoir chamber 112. It is preferred that the amount of liquid within the housing should be a volume totaling 90% hydraulic fluid, leaving 10% air space within the reservoir chamber 112 when the rod 14 is in a fully retracted position relative to the housing. The hydraulic fluid will divide itself between the piston and reservoir chambers freely through openings in the member 54 and openings, generally indicated by the numeral 120, extending longitudinally through the piston means 50. As long as the rate of movement or velocity of the rod 14 with piston means 50 relative to the housing, together with the symmetrical valving at opposite sides thereof, remains at a predetermined rate, depending upon the exact spring force of discs 88, 88′, 96 and 96′, as well as dimensions of the holes and openings 72 and 120, respectively, liquid can pass freely to opposite sides of the piston means 50 into piston chamber portions 114 and 114′, respectively.

The exact cooperative relationship of the symmetrical valving including these discs can be more clearly seen and understood in the enlarged fragmentary view of the piston means 50 and cooperating parts, as shown in Figure 3.

Figure 3 shows arrows to indicate flow of hydraulic fluid between piston chamber portions 114 and 114′ about the outer periphery of rings 94 and 94′ by way of longitudinal passages 120 in a body portion 122 of the piston means 50. The body portion 122 cooperates with the sleeve 16 at its peripheral portions and seals 124 are disposed in radially inwardly extending grooves 126 with the body portion 122 of piston means 50. In the assembly of the annular pieces 84 and 84′ on the threads 82 and 82′, it may be advisable to stake or mutilate the threads to assure against possible rotation or movement of pieces 84 and 84′ away from the exact positions indicated in the drawings. Also, more clearly visible in Figure 3 are annular spacers or shims 128 and 128′ disposed between the body 122 of the piston means and discs 96 and 96′. The discs 88 and 88′ are preferably of less thickness than the discs 96 and 96′ for added pivotal flexibility relative to their mounting with parts of the velocity limiting device as described above.

It is to be understood that the discs 88, 88′, 96 and 96′ are flexible to the extent that a pivotal action can occur to parallelogram their relationship relative to rings 94 and 94′ causing seating engagement of either disc 96 or disc 96′ against the body 122 in a conical pattern about spacers 128 and 128′ causing closure of passages 120 whenever pressure due to rate of flow of fluid, as indicated by the arrows, exceeds the resilient force inherent in the spring steel disc. This pressure causes the rings 94 or 94′ to wedge into sealing engagement against the piston body 122 and cut off fluid flow until there is a relief of pressure occurring thereon allowing the flow rate of the fluid to drop back to or below the predetermined rate. The discs 88 and 88′ are securely retained between rings 94 and 94′, respectively, along flanges 92 and 92′, as described with Figure 2. The radially inwardly extending periphery of the discs 88 and 88′ is pivotally disposed relative to flanges 86 and 86′ with fittings 84 and 84′, respectively. The outer periphery of the discs 88 and 88′ is also pivotal relative to the rings 94 and 94′.

Figure 4:
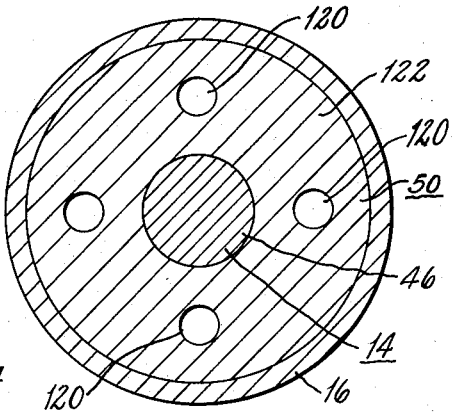
Figure 4 is a cross-sectional view taken along line 4—4 of Figure 3.

Figure 4 is a cross-sectional view on line 4—4 of Figure 3 to show location of the passages 120 in quadrature or at 90° angles relative to each other within the body portion 122 of the piston means 50. More than or less than four holes can be provided. The rod 14, at its small diameter portion 46, fits through the body portion 122 of the piston means to be slidably cooperable therewith against the cylinder 16 of the damper housing in the present invention.

The hydraulic velocity limiting device of the present invention can be used in parallel or in series with mechanism actuating a control action such as a control rod, or cable to prevent movement thereof above a safe specified velocity. The invention is particularly useful in aircraft controls to parallel the control action actuating mechanism. The damping action effected by the device occurs with the mechanism described with Figures 2 and 3. For example, the rod 14 of the device can move together with the control action actuating mechanism, not shown toward an extended position of rod 14 to its limit of travel. In the course of this extend movement, the valving symmetrically disposed with piston means 50 remains in valve-open relationship relative to passages 120 so long as the rate of movement and corresponding rate of flow of fluid therethrough is equal to or less than the resistance thereto provided by the spring discs of the valving symmetrically located with the piston means 50. A smooth flow permitting escape of fluid from the chamber 114 to the chamber 114′ occurs with this extend movement. However, as soon as the rate of movement of the piston means 50 exceeds the predetermined limit dependent upon the structural and dimensional relationships of the valving parts, the continued decrease of the volume in chamber 114 is abruptly stopped because the rate of flow in exceeding the spring pressure of the discs 88 and 96 causes the disc 96 to seat itself annularly in a conical-like structure relative to spacer 128 causing closure of the passages 120 in the piston means. This closure occurs instantaneously and effects a trapping of fluid within the confines of the chamber 114 between the piston means 50 and the end cover 40 within cylinder 16. The valving with the piston means 50 does not reopen until the pressure due to excessive rate of flow is returned to a value equal to or less than the spring pressure of the discs 88 and 96.

A flow of fluid occurs with retract movement of the velocity limiting device with control action actuating mechanism through the valving symmetrically disposed with the piston means 50 in a manner similar to that just described for extending movement. However, the rod 14 is then moving to an inward position relative to the housing of the damper and in so doing, the piston means 50 with passages 120 permits flow of fluid from the chamber 114' to the chamber 114. A balancing position of check valve balls 80 disposed with the recesses 76 of the partition 60 may occur as fluid interchange is made between chamber 114 and 114'. However, as soon as the rate of flow of fluid exceeds the weight of these balls, the balls seat against the sleeves 78 at one end or against the seat 74. The balls can lodge against seats 74 during extend movement to stop further supply of fluid from the reservoir chamber to chamber 114' before or just prior to closure of the passages 120 by disc 96, as described above. The balls 80 similarly seat against the annular periphery of sleeves 78 when the piston means 50 with the rod 14 move toward a retracted position thereby trapping fluid within chamber 114' and permitting flow of fluid from chamber 114' to chamber 114 only so long as the rate of movement does not exceed the rate of pressure flow permitted by the spring discs 88' and 96'. As soon as the rate of flow exceeds this pressure value, the spring disc 96' is deformed to a conical shape relative to the spacer 128', thereby sealing off the passages 120 and locking fluid within chamber 114' to effect the checking or velocity limiting action of the present invention.

While the embodiment of the present invention as herein disclosed constitutes a preferred form, it is to be understood that other forms might be adopted.

What is claimed is as follows:

1. A hydraulic means to permit movement only below a predetermined rate, comprising, a housing having an opening in one end thereof, a double ended rod reciprocable relative to said housing through the opening, a piston having apertures therethrough attached centrally of said rod, a partitioning member slidably engaged by said rod to divide said housing into a reservoir chamber and a piston chamber of two portions, a check valve in each of several passages of said partitioning member capable of sealing off the reservoir chamber from the piston chamber, and valve means located on said piston and said rod on opposite sides of said piston, said valve means on each side including a pair of spring discs arranged parallel to each other, an annular member connected between the outer annular periphery of each of said discs and movable therewith thereby capable of effecting closing off of the apertures through said piston preventing movement exceeding a predetermined hydraulic flow about said ring and the periphery of said discs through the piston apertures from one portion to the other portion of the piston chamber.

2. A velocity limiting means for use with a control action actuating mechanism so that an operator in panic can effect movement only below a predetermined rate, comprising, a cylindrical housing, a piston reciprocable in said housing, a rod connected with said piston and valve means located with said piston and said rod on opposite sides of said piston, said valve means on each side including first and second spring discs arranged to parallel each other, an annular member connected between the outer annular periphery of each of said discs and movable therewith capable of thereby effecting closing off of apertures through said piston.

3. A velocity limiting means for use in parallel or in series with a control action actuating mechanism to limit movement to within a predetermined velocity, comprising, a cylinder, a centrally-apertured end-cap attached to one end of said cylinder, a cup-shaped end body attached to the opposite end of said cylinder, a partition member with a central aperture located between said cylinder and end body forming a reservoir chamber with the end body and a piston chamber with the cylinder, a rod reciprocally disposed in the velocity limiting means and extending through said piston chamber and said central apertures, a piston means carried by said rod to divide the piston chamber into separate portion and having opening means therethrough, spring means on said rod at each of opposite sides of said piston means, and an annular member cooperable with said spring means to be shiftable relative to said piston means for closing off the opening means through said piston means, said spring means providing resistance against closing off the holes to permit fluid flow therethrough in either direction up to a predetermined value of pressure in said piston chamber on either side of said piston means before closure of the holes effects velocity limiting check action.

4. The velocity limiting means of claim 3 wherein said spring means comprises a pair of discs on each side of said piston means, each pair having a first disc that extends outwardly radially more than a second disc, said rod having a large daimeter portion and a small diameter portion said small diameter portion of said rod receiving each said second disc adjacent said piston means on opposite sides thereof, a sleeve of the same outer diameter as the large diameter portion of said rod fitted over the small diameter portion thereof, a pair of fittings each pivotally receiving the inner periphery of each said second disc attached respectively to the large diameter portion and one end of said sleeve with said rod, and wherein said annular member is a ring located between the outer peripheries of said first and second discs.

5. The velocity limiting means of claim 4 wherein an annular spacer separates said first disc from said piston means on each side thereof to permit parallelogramming of said first and second discs with said ring to engage said piston means closing off the holes therethrough.

6. The velocity limiting means of claim 2 wherein each said first disc is of spring steel having a thickness greater than each said second disc of spring steel for added movable resilience.

7. The velocity limiting means of claim 2 wherein each said second disc and said piston is separated by an annular spacer located therebetween relative to which said first and second discs are pivotally movable in parallelogram relation between said rod and said annular member to effect closing off of apertures through said piston.

References Cited in the file of this patent

UNITED STATES PATENTS

| | | |
|---|---|---|
| 1,028,400 | Stanton | June 4, 1912 |
| 2,161,811 | Grebe | June 13, 1939 |
| 2,310,570 | Briggs | Feb. 9, 1943 |
| 2,314,404 | Katcher | Mar. 23, 1943 |

FOREIGN PATENTS

| | | |
|---|---|---|
| 595,592 | France | July 20, 1925 |
| 878,131 | Germany | June 1, 1953 |